(12) United States Patent
Hayakawa

(10) Patent No.: US 10,366,520 B2
(45) Date of Patent: Jul. 30, 2019

(54) INFORMATION PROCESSING APPARATUS AND METHOD OF CONTROLLING THE SAME

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 15/218,206

(22) Filed: Jul. 25, 2016

(65) Prior Publication Data

US 2017/0039745 A1 Feb. 9, 2017

(30) Foreign Application Priority Data

Aug. 7, 2015 (JP) .................. 2015-157507

(51) Int. Cl.
*G06T 11/60* (2006.01)
*H04N 1/00* (2006.01)
*G06T 7/00* (2017.01)
*G06K 9/62* (2006.01)

(52) U.S. Cl.
CPC .............. *G06T 11/60* (2013.01); *G06K 9/628* (2013.01); *G06T 7/0002* (2013.01); *H04N 1/00137* (2013.01); *H04N 1/00161* (2013.01); *H04N 1/00196* (2013.01)

(58) Field of Classification Search
CPC .... G06T 11/60; G06F 17/3028; G06F 17/248; G06K 9/00684; G06K 9/46; G06K 9/62
See application file for complete search history.

(56) References Cited

U.S. PATENT DOCUMENTS 6,123,362 A * 9/2000 Squilla ................. H04N 1/3875
   281/31
6,358,341 B1 * 3/2002 Bergquist .................. B42F 5/00
   156/256
(Continued)

FOREIGN PATENT DOCUMENTS

JP   2005-242604 A   9/2005
JP   2007-249434 A   9/2007
(Continued)

OTHER PUBLICATIONS

U.S. Appl. No. 15/051,945, Mizuki Hayakawa, filed Feb. 24, 2016.
US 2012/0321223 A1 (the May 30, 2018 and Nov. 26, 2018 Official Actions).

*Primary Examiner* — Bobbak Safaipour
(74) *Attorney, Agent, or Firm* — Venable LLP

(57) ABSTRACT

An apparatus that creates an electronic album laying-out images in units of pages from a plurality of image files, comprising a management unit which manages, by classifying into a plurality of pre-set categories, templates that define a location region of an image to be located in a page, a setting unit which sets one of the plurality of categories for each page, a decision unit which analyzes image files that are targets to include in an electronic album, and decides images that are targets to lay out in each page, and a layout unit which lays out each decided image as a target to lay out to a page of interest, by using a template classified into a category set to a page of interest by the setting unit from the templates managed by the management unit.

24 Claims, 15 Drawing Sheets

(56) References Cited

U.S. PATENT DOCUMENTS

| | | | |
|---|---|---|---|
| 7,474,801 B2 * | 1/2009 | Teo | H04N 1/00132 358/1.18 |
| 7,746,512 B2 | 6/2010 | Yamakado et al. | |
| 8,054,515 B2 | 11/2011 | Yamakado et al. | |
| 8,493,610 B2 | 7/2013 | Kitagawa et al. | |
| 9,208,595 B2 * | 12/2015 | Sasaki | G06T 11/60 |
| 9,288,339 B2 | 3/2016 | Kaneko | |
| 9,325,869 B2 | 4/2016 | Nagasaka et al. | |
| 9,406,158 B2 | 8/2016 | Yamaji | |
| 9,596,370 B2 * | 3/2017 | Hayakawa | H04N 1/00572 |
| 9,852,325 B2 | 12/2017 | Sasaki et al. | |
| 10,127,436 B2 | 11/2018 | Sasaki et al. | |
| 10,169,893 B2 * | 1/2019 | Diverdi | G06T 11/60 |
| 2005/0200912 A1 | 9/2005 | Yamakado et al. | |
| 2008/0304718 A1 * | 12/2008 | Ryuto | G06K 9/00228 382/118 |
| 2010/0239176 A1 | 9/2010 | Yamakado et al. | |
| 2012/0151332 A1 | 6/2012 | Kaneko | |
| 2012/0198384 A1 * | 8/2012 | Kumamoto | G06F 3/048 715/786 |
| 2012/0321223 A1 * | 12/2012 | Nagasaka | H04N 1/00448 382/305 |
| 2014/0010444 A1 | 1/2014 | Sasaki et al. | |
| 2015/0086116 A1 | 3/2015 | Yamaji | |
| 2016/0048724 A1 | 2/2016 | Sasaki et al. | |
| 2017/0038930 A1 * | 2/2017 | Hayakawa | G06F 3/0483 |
| 2017/0039223 A1 * | 2/2017 | Hayakawa | G06F 16/58 |
| 2017/0040003 A1 * | 2/2017 | Takenouchi | G09G 5/00 |
| 2017/0187893 A1 * | 6/2017 | Hayakawa | H04N 1/00196 |
| 2018/0068176 A1 | 3/2018 | Sasaki et al. | |

FOREIGN PATENT DOCUMENTS

| | | |
|---|---|---|
| JP | 2012-138895 A | 7/2012 |
| JP | 2013-031159 A | 2/2013 |
| JP | 2014-016825 A | 1/2014 |
| JP | 2015-089112 A | 5/2015 |

* cited by examiner

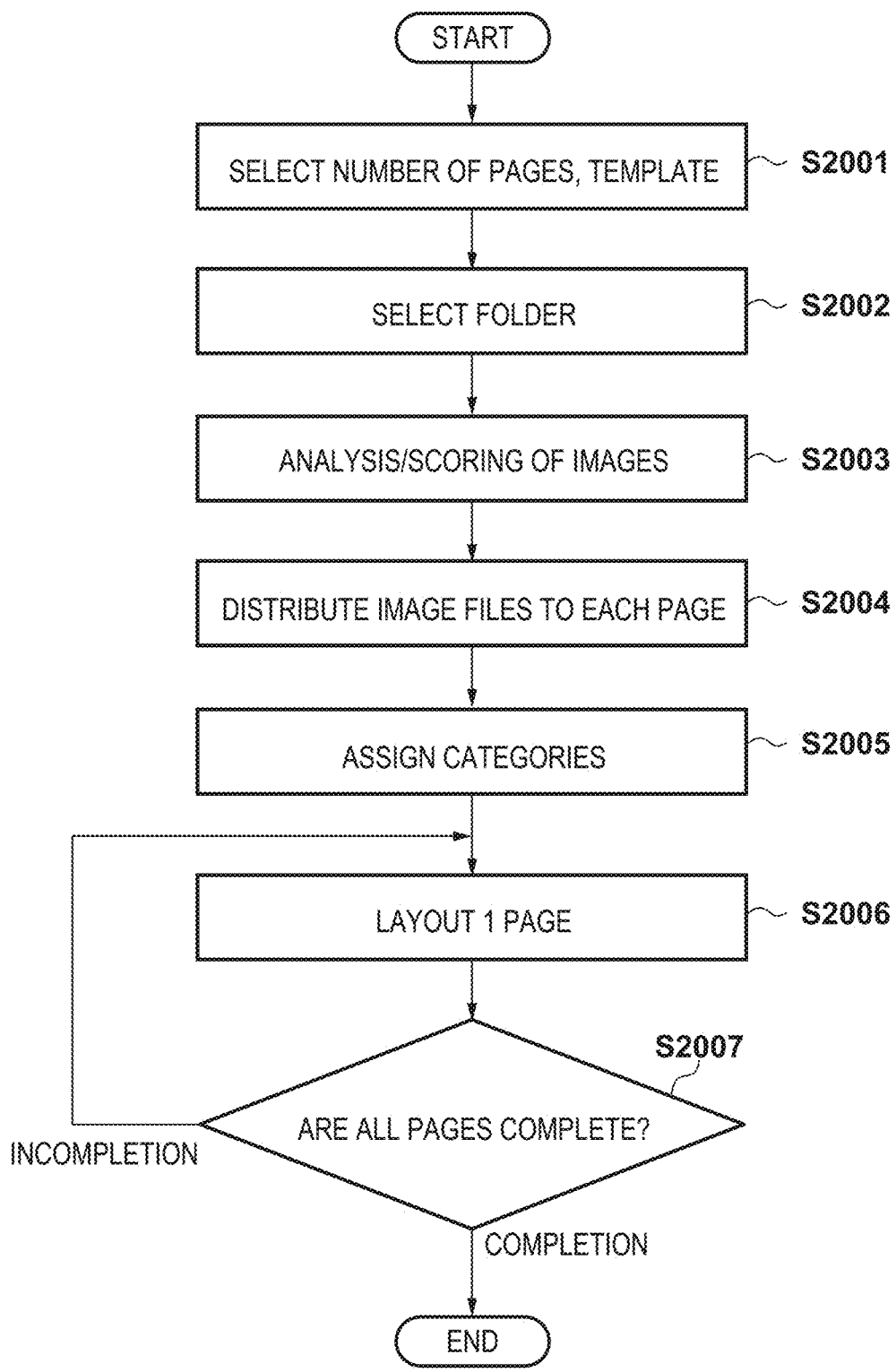

FIG. 4A

| SLOT FRAME | POSITION (x, y) | SIZE (w, h) | PRIORITY ORDER | PROCESSING | ANGLE | SHAPE |
|---|---|---|---|---|---|---|
| FIRST SLOT | 30, 30 | 320, 270 | 1 | NONE | 0 DEGREES | RECTANGULAR |
| SECOND SLOT | 450, 60 | 200, 160 | 2 | NONE | 0 DEGREES | RECTANGULAR |
| THIRD SLOT | 100, 320 | 200, 160 | 2 | NONE | 0 DEGREES | RECTANGULAR |
| FOURTH SLOT | 450, 320 | 200, 160 | 2 | NONE | 0 DEGREES | RECTANGULAR |

FIG. 4B

| SLOT FRAME | POSITION (x, y) | SIZE (w, h) | PRIORITY ORDER | PROCESSING | ANGLE | SHAPE |
|---|---|---|---|---|---|---|
| FIRST SLOT | 100, 60 | 200, 160 | 2 | NONE | 0 DEGREES | RECTANGULAR |
| SECOND SLOT | 380, 30 | 320, 270 | 1 | NONE | 0 DEGREES | RECTANGULAR |
| THIRD SLOT | 100, 320 | 200, 160 | 2 | NONE | 0 DEGREES | RECTANGULAR |
| FOURTH SLOT | 450, 320 | 200, 160 | 2 | NONE | 0 DEGREES | RECTANGULAR |

FIG. 4C

| SLOT FRAME | POSITION (x, y) | SIZE (w, h) | PRIORITY ORDER | PROCESSING | ANGLE | SHAPE |
|---|---|---|---|---|---|---|
| FIRST SLOT | 100, 60 | 200, 160 | 2 | NONE | 0 DEGREES | RECTANGULAR |
| SECOND SLOT | 450, 60 | 200, 160 | 2 | NONE | 0 DEGREES | RECTANGULAR |
| THIRD SLOT | 30, 250 | 320, 270 | 1 | NONE | 0 DEGREES | RECTANGULAR |
| FOURTH SLOT | 450, 320 | 200, 160 | 2 | NONE | 0 DEGREES | RECTANGULAR |

FIG. 4D

| SLOT FRAME | POSITION (x, y) | SIZE (w, h) | PRIORITY ORDER | PROCESSING | ANGLE | SHAPE |
|---|---|---|---|---|---|---|
| FIRST SLOT | 100, 60 | 200, 160 | 2 | NONE | 0 DEGREES | RECTANGULAR |
| SECOND SLOT | 450, 60 | 200, 160 | 2 | NONE | 0 DEGREES | RECTANGULAR |
| THIRD SLOT | 100, 320 | 200, 160 | 2 | NONE | 0 DEGREES | RECTANGULAR |
| FOURTH SLOT | 380, 250 | 320, 270 | 1 | NONE | 0 DEGREES | RECTANGULAR |

F I G. 6A

| SLOT FRAME | POSITION (x, y) | SIZE (w, h) | PRIORITY ORDER | PROCESSING | ANGLE | SHAPE |
|---|---|---|---|---|---|---|
| FIRST SLOT | 0, 0 | 480, 280 | 1 | NONE | 0 DEGREES | CIRCULAR |
| SECOND SLOT | 500, 60 | 180, 180 | 2 | NONE | 0 DEGREES | CIRCULAR |
| THIRD SLOT | 30, 300 | 180, 180 | 2 | NONE | 0 DEGREES | CIRCULAR |
| FOURTH SLOT | 350, 280 | 180, 180 | 2 | NONE | 0 DEGREES | CIRCULAR |

F I G. 6B

| SLOT FRAME | POSITION (x, y) | SIZE (w, h) | PRIORITY ORDER | PROCESSING | ANGLE | SHAPE |
|---|---|---|---|---|---|---|
| FIRST SLOT | 30, 60 | 180, 180 | 2 | NONE | 0 DEGREES | CIRCULAR |
| SECOND SLOT | 250, 0 | 480, 280 | 1 | NONE | 0 DEGREES | CIRCULAR |
| THIRD SLOT | 150, 280 | 180, 180 | 2 | NONE | 0 DEGREES | CIRCULAR |
| FOURTH SLOT | 510, 300 | 180, 180 | 2 | NONE | 0 DEGREES | CIRCULAR |

F I G. 6C

| SLOT FRAME | POSITION (x, y) | SIZE (w, h) | PRIORITY ORDER | PROCESSING | ANGLE | SHAPE |
|---|---|---|---|---|---|---|
| FIRST SLOT | 30, 30 | 180, 180 | 2 | NONE | 0 DEGREES | CIRCULAR |
| SECOND SLOT | 350, 30 | 180, 180 | 2 | NONE | 0 DEGREES | CIRCULAR |
| THIRD SLOT | 0, 230 | 480, 280 | 1 | NONE | 0 DEGREES | CIRCULAR |
| FOURTH SLOT | 500, 250 | 180, 180 | 2 | NONE | 0 DEGREES | CIRCULAR |

F I G. 6D

| SLOT FRAME | POSITION (x, y) | SIZE (w, h) | PRIORITY ORDER | PROCESSING | ANGLE | SHAPE |
|---|---|---|---|---|---|---|
| FIRST SLOT | 160, 30 | 180, 180 | 2 | NONE | 0 DEGREES | CIRCULAR |
| SECOND SLOT | 500, 30 | 180, 180 | 2 | NONE | 0 DEGREES | CIRCULAR |
| THIRD SLOT | 30, 250 | 180, 180 | 2 | NONE | 0 DEGREES | CIRCULAR |
| FOURTH SLOT | 250, 250 | 480, 280 | 1 | NONE | 0 DEGREES | CIRCULAR |

F I G. 8A

| SLOT FRAME | POSITION (x, y) | SIZE (w, h) | PRIORITY ORDER | PROCESSING | ANGLE | SHAPE |
|---|---|---|---|---|---|---|
| FIRST SLOT | 0, 0 | 480, 350 | 1 | GRADATION | 0 DEGREES | RECTANGULAR |
| SECOND SLOT | 480, 30 | 180, 180 | 2 | NONE | 10 DEGREES | RECTANGULAR |
| THIRD SLOT | 250, 280 | 180, 180 | 2 | NONE | 10 DEGREES | RECTANGULAR |
| FOURTH SLOT | 520, 280 | 180, 180 | 2 | NONE | -10 DEGREES | RECTANGULAR |

F I G. 8B

| SLOT FRAME | POSITION (x, y) | SIZE (w, h) | PRIORITY ORDER | PROCESSING | ANGLE | SHAPE |
|---|---|---|---|---|---|---|
| FIRST SLOT | 60, 30 | 180, 180 | 2 | NONE | 10 DEGREES | RECTANGULAR |
| SECOND SLOT | 250, 0 | 480, 350 | 1 | GRADATION | 0 DEGREES | RECTANGULAR |
| THIRD SLOT | 30, 280 | 180, 180 | 2 | NONE | -10 DEGREES | RECTANGULAR |
| FOURTH SLOT | 280, 280 | 180, 180 | 2 | NONE | 10 DEGREES | RECTANGULAR |

F I G. 8C

| SLOT FRAME | POSITION (x, y) | SIZE (w, h) | PRIORITY ORDER | PROCESSING | ANGLE | SHAPE |
|---|---|---|---|---|---|---|
| FIRST SLOT | 230, 30 | 180, 180 | 2 | NONE | 10 DEGREES | RECTANGULAR |
| SECOND SLOT | 480, 30 | 180, 180 | 2 | NONE | -10 DEGREES | RECTANGULAR |
| THIRD SLOT | 0, 160 | 480, 280 | 1 | GRADATION | 0 DEGREES | RECTANGULAR |
| FOURTH SLOT | 480, 280 | 180, 180 | 2 | NONE | 10 DEGREES | RECTANGULAR |

F I G. 8D

| SLOT FRAME | POSITION (x, y) | SIZE (w, h) | PRIORITY ORDER | PROCESSING | ANGLE | SHAPE |
|---|---|---|---|---|---|---|
| FIRST SLOT | 30, 30 | 180, 180 | 2 | NONE | -10 DEGREES | RECTANGULAR |
| SECOND SLOT | 320, 30 | 180, 180 | 2 | NONE | 10 DEGREES | RECTANGULAR |
| THIRD SLOT | 30, 280 | 180, 180 | 2 | NONE | 0 DEGREES | RECTANGULAR |
| FOURTH SLOT | 280, 160 | 480, 280 | 1 | GRADATION | 10 DEGREES | RECTANGULAR |

| IMAGE | TEMPORAL SEQUENCE | SCORE |
|---|---|---|
| IMAGE 901 | 1 | 100 |
| IMAGE 902 | 2 | 50 |
| IMAGE 903 | 3 | 50 |
| IMAGE 904 | 4 | 50 |

FIG. 11

| PAGE NUMBER | CATEGORY |
|---|---|
| 1-2 | 1 |
| 3-4 | 1 |
| 5-6 | 2 |
| 7-8 | 1 |
| 9-10 | 3 |

INFORMATION PROCESSING APPARATUS AND METHOD OF CONTROLLING THE SAME

BACKGROUND OF THE INVENTION

Field of the Invention

The present invention relates to a technique of creating an album from a plurality of pieces of image data captured by a digital camera or the like.

Description of the Related Art

There is a conventional technique of automatically creating a photo album by locating images in a template. In addition, a technique in which, to select a template suitable in accordance with image content, an image is analyzed to determine an event, and a template in accordance with the image is selected by selecting a template linked to the determined event is known. For example, Japanese Patent Laid-Open No. 2015-89112.

However, when creating a photo album, there may be a desire to add changes to the photo album as a whole, by using an average template for a first half, changing a slot form in a second half, and producing an image processing effect in images. However, with the techniques recited in the above documents, if the details of a plurality of images located in an album are the same for example, the same template will continue to be selected. Therefore, in accordance with a selected image file, a photo album with sparse variation may be automatically generated by an average template being selected for all pages.

SUMMARY OF THE INVENTION

To solve this problem, according to an aspect of the invention, there is provided an information processing apparatus that creates an electronic album laying-out images in units of pages from a plurality of image files, the apparatus comprising: a management unit configured to manage, by classifying into a plurality of pre-set categories, templates that define a location region of an image to be located in a page; a setting unit configured to set one of the plurality of categories for each page; a decision unit configured to analyze image files that are targets to include in an electronic album, and decide images that are targets to lay out in each page; and a layout unit configured to lay out each image that is decided by the decision unit as a target to lay out to a page of interest, by using a template classified into a category set to a page of interest by the setting unit from the templates managed by the management unit.

By virtue of the present invention, it is possible to create an electronic album having a good appearance as a photo album overall, because, from templates divided into categories, a template corresponding to a category set to a page is used for the layout of that page.

Further features of the present invention will become apparent from the following description of exemplary embodiments (with reference to the attached drawings).

BRIEF DESCRIPTION OF THE DRAWINGS

FIG. 2 is a photo album creation flowchart, for explaining a first embodiment.

FIGS. 4A-4D are views illustrating table data of the basic form templates of the first embodiment.

FIGS. 6A-6D are views illustrating table data of the non-rectangular templates of the first embodiment.

FIGS. 8A-8D are views illustrating table data of the effect-type templates of the first embodiment.

FIG. 10 is a view illustrating a scoring result of a layout candidate image of the first embodiment.

FIG. 11 is a view illustrating an example of setting categories for each page in the first embodiment.

DESCRIPTION OF THE EMBODIMENTS

Below, explanation is given in detail of preferred embodiments of the present invention, with reference to the accompanying drawings. Note that the following embodiments do not limit the present invention in regard to the scope of the patent claims, and, in addition, there is no limitation to all combinations of the features explained in the embodiments being necessary for means for solving the present invention.

First Embodiment

Figure 1:
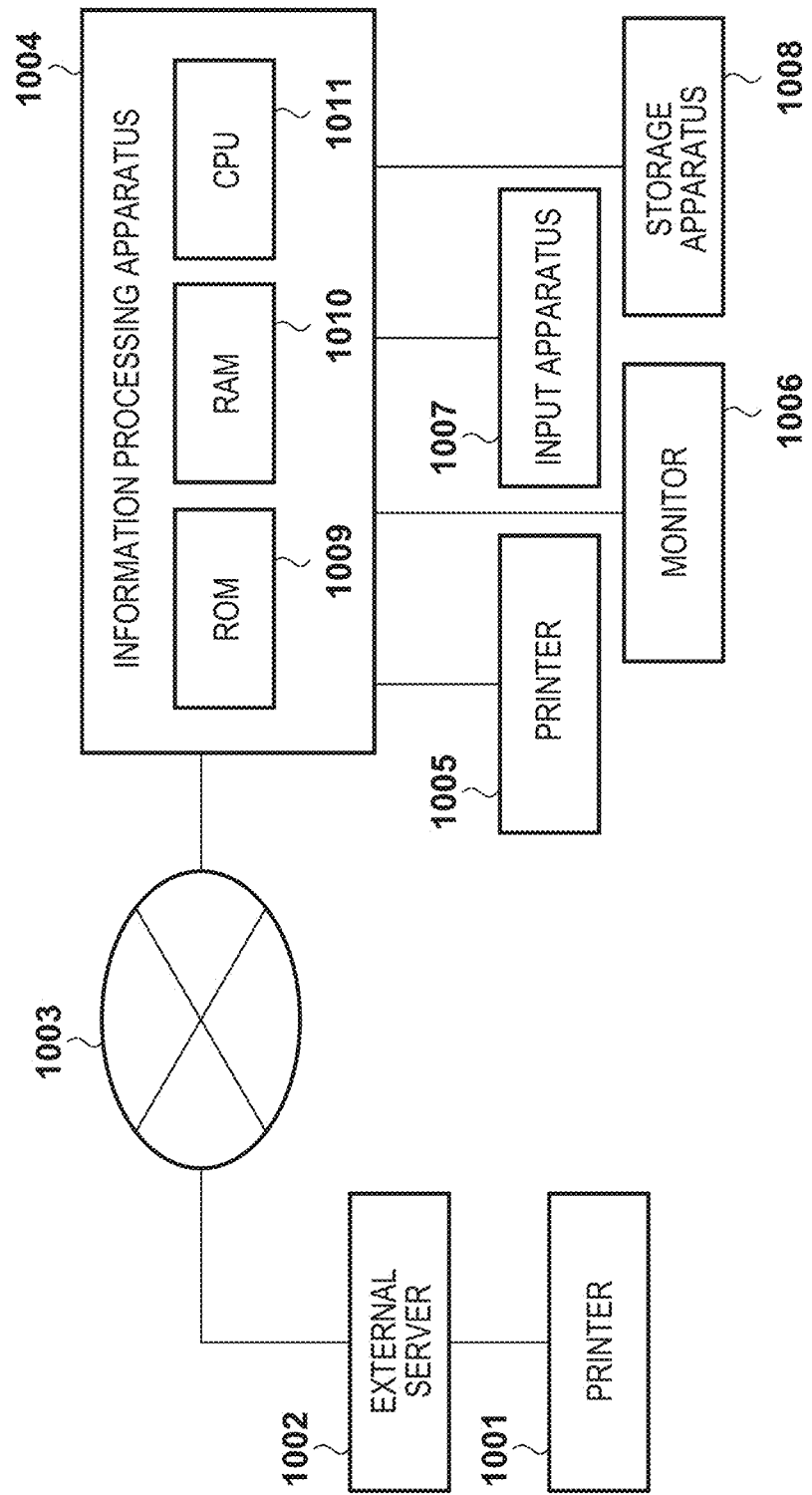
FIG. 1 is a configuration diagram of an information processing apparatus for explaining a first embodiment.
Figure 3A:
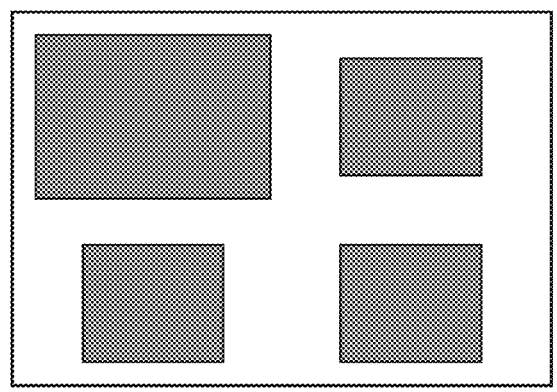
FIGS. 3A-3D are views illustrating basic form templates of the first embodiment.
Figure 3B:
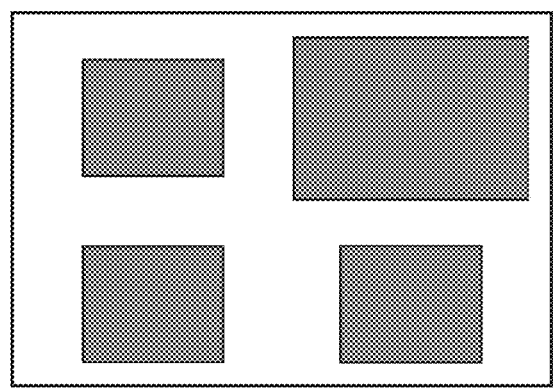
Figure 3C:
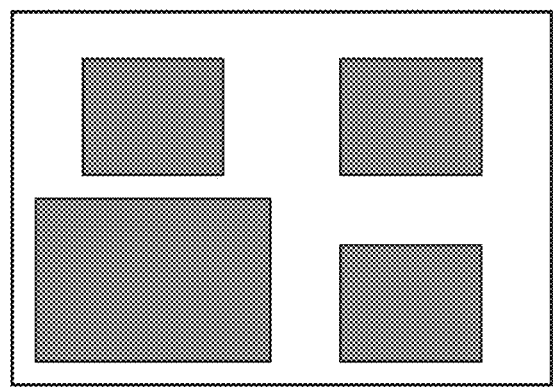
Figure 3D:
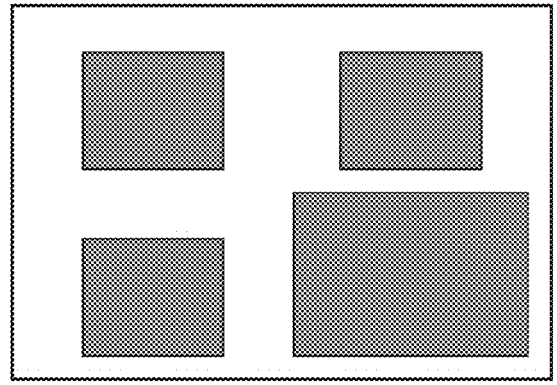

Firstly, FIG. 1 is used to give an explanation regarding a configuration of an information processing apparatus 1004 of a first embodiment. The information processing apparatus 1004 can create an electronic album (a photo album, a photo book) from an input plurality of pieces of image data. In addition, the information processing apparatus 1004 can output the created electronic album (hereinafter referred to simply as an album) as print data, and upload (transmit) it to an external server 1002 on a network to request binding creation (includes billing processing) by a printer 1001 that the external server 1002 has. The information processing apparatus 1004 has a ROM 1009, a RAM 1010, and a CPU 1011. In addition, it has a printer 1005, a monitor 1006, an input apparatus 1007, a storage apparatus 1008, and an input/output interface (not shown) for connecting with a network 1003. The CPU 1011 is a central processing unit, and performs control of the information processing apparatus 1004 as a whole by executing an operating system program (hereinafter, abbreviated as OS) stored in the storage apparatus 1008, the ROM 1009, or the RAM 1010. In addition, by executing a program stored in the ROM 1009 or the RAM 1010, the CPU 1011 controls and executes realization of each functional configuration of the information processing apparatus 1004, calculation or processing of information, and each piece of hardware. The ROM 1009 is a read-only memory, and stores a program such as a BIOS. The RAM 1010 is a random access memory, and stores various programs if it is a work memory of the CPU 1011 or a non-volatile RAM. This includes the operating system (OS) and an application program for realizing later-described processing of the embodiments.

The information processing apparatus 1004 and the external server 1002 are connected to the network 1003 as a communication network, and can mutually perform transfer of information. The external server 1002 is connected to the printer 1001 via an input/output interface (not shown). An album created by the information processing apparatus 1004 is uploaded to the external server 1002 via the network 1003. If print conditions of the uploaded album are satisfied, the external server 1002 outputs it to the printer 1001. For example, the external server 1002 is an album order reception/management server. If the external server 1002 determines that an album from the information processing apparatus 1004 of a user has been received, and required album printing/purchase procedures (a number of print copies, billing processing) have been performed, the external server 1002 performs printing and binding processing by the printer 1001. Thereafter, outputted print material is delivered to a user's hands.

Meanwhile, the printer 1005 is also connected to the information processing apparatus 1004. Therefore, a user can also cause the printer 1005 to perform print processing of the album created by the information processing apparatus 1004. In accordance with a form, configuration may be such that a user prints a created album by the printer 1005 that they themself own, and a user binds it and finishes the album. The monitor 1006 is a display apparatus for displaying image information outputted in the information processing apparatus 1004. The input apparatus 1007 is an input apparatus, such as a keyboard or a pointing device, for performing input to the information processing apparatus 1004. Depending on the form of the input apparatus it may be an apparatus for a configuration in which it is integrated with a monitor and input is performed by directly touching the monitor. The storage apparatus 1008 stores an OS and an application for realizing processing of embodiments. Furthermore, the storage apparatus 1008 is also used for storing and managing image files captured by a digital camera that the user possesses in units of folders. In addition, the storage apparatus 1008 further stores a template for generating an album, for example. The storage apparatus 1008 is typically a large-capacity non-volatile storage apparatus, as typified by an HDD or an SSD.

Note that, the block diagram recites the monitor 1006, the input apparatus 1007, and the storage apparatus 1008 as separate from the information processing apparatus. However, depending on the form of the information processing apparatus, a monitor, input apparatus, and a storage apparatus (may be shared with RAM of the information processing apparatus) may be included as a component of an integrated information processing apparatus.

Next, explanation is given in accordance with the flowchart of FIG. 2 of a processing procedure of the CPU 1011 for when the application program for creating an album is executed in the information processing apparatus 1004. Upon execution, the application program is loaded from the storage apparatus 1008 into the RAM 1010, and the CPU 1011 executes the application program under control of the OS.

In step S2001, the CPU 1011, in accordance with input via the input apparatus 1007 from a user, performs designation of a number of pages, and selection of templates to use in the electronic album. There are a plurality of templates, each of which being something created in advance by a designer or the like, and they are stored in the storage apparatus 1008 as data. Templates to use in the album are selected via a user interface (not shown). FIG. 3A through FIG. 8D are used to explain templates and the categories thereof.

FIGS. 3A-3D illustrate basic form templates. FIGS. 4A-4D illustrate concrete examples of table format data for templates, respectively corresponding to FIGS. 3A-3D. A table stores coordinate values, a size, a priority order, a processing method, an angle, shape, or the like for each slot (a frame indicating an outer periphery in which an image is mounted) that defines a location region for locating an image in a page. Note that, in FIGS. 4A-4D, the priority order being all 2 except for where it is 1 indicates that, other than an image to prioritize highest, they are the same level. Of course, a priority order as indicated by a magnitude relationship for values 1 through 4 may be set. Below, these templates in which slot shapes are rectangular are referred to as category 1 or templates belonging to category 1.

FIGS. 5A-5D illustrate templates having non-rectangular slots. FIGS. 6A-6D illustrate concrete examples of table format data for templates, respectively corresponding to FIGS. 5A-5D. The tables store the coordinate values, the priority order, the processing method, the angle, and the shape of each slot. The differences with the basic form templates of FIGS. 3A-3D are only in the position, size and shape of the slots, and the priority order is not changed. These templates are referred to as category 2 or templates belonging to category 2. Note that, in the embodiments, a circle or an ellipse are used as examples of non-rectangular shapes, but non-rectangular shapes such as polygons and star shapes are assumed to be included in this category.

FIGS. 7A-7D illustrate effect templates in which image editing (image effect processing) or the like is included. FIGS. 8A-8D illustrate concrete examples of table format data for templates, respectively corresponding to FIGS. 7A-7D. These tables only differ in the position, the size, the shape, and processing of each slot, and the priority order does not change. These templates are referred to as category 3 or templates belonging to category 3. Note that, in the embodiments, explanation is given of an example of using a gradation effect as an example of processing, but this category includes processing that involves image editing such as converting to grayscale or making transparent.

Note that, the templates given as examples in FIG. 3A through FIG. 8D, are examples in which a number of image slots was four, but the number of image slots is not limited to this, and there is no restriction on this number. Therefore, templates other than the above are stored in the storage apparatus 1008. However, after classifying categories, the templates are assumed to be managed so as to be broadly divided into categories 1 through 3. Note that, to classify and manage the templates by category, a method in which the templates are stored in folders by category is used. As the case may be, a template may be caused to hold therein information indicating to which category it belongs.

In step S2002, the CPU 1011 selects a folder in the storage apparatus 1008 that stores image files, in accordance with input via the input apparatus 1007 from a user. In step S2003, the CPU 1011 acquires the image files stored in the folder selected by the user, analyzes each image, and performs scoring (an evaluation value calculation) in accordance with a pre-set algorithm. Note that a number of folders that it is possible to designate may be two or more. If a further folder (a subfolder) is present in the designated folder, image files in the subfolder are also targets. Consequently, if folders having a tree structure in the order of year, month and day are created, by designating a highest year, it is possible to create an album for one year.

Images 901-904 illustrated in FIGS. 9A-9D are examples of images indicated by image files stored in a folder designated by a user. An result of scoring the images 901-904 is illustrated in FIG. 10. Note that, as an algorithm for the scoring, whatever the particular type thereof, for example, rating information stored in image meta-information is used in scoring, or scoring is performed by an independent reference in accordance with frequency analysis or histogram of an image or a face detection result. In any event, scoring is assumed to be something that orders a score value of each image in a capturing date/time order. As illustrated in FIG. 10, a score for an image 901 having an oldest capturing date/time is highest, and other images 902-904 continue from the score of the image 901.

In step S2004, the CPU 1011 distributes images indicated by the image files in the designated folder to the pages. For example, the CPU 1011 selects image files having a score value greater than or equal to a pre-set reference value (greater than or equal to a threshold value) as distribution targets. The CPU 1011 clusters the image files that have become distribution targets in accordance with respective capturing dates. The CPU 1011 distributes images so that image files with the same capturing date have the same page. For example, it is assumed that, in a case of using a template for assigning four images to one page, 20 image files having the same capturing date are distribution targets in accordance with clustering. In such a case, the CPU 1011 decides to distribute the 20 images for the same capturing date over five pages. The CPU 1011 distributes the above 20 images so that a bias of score values of the image files distributed to the five pages becomes small. Simply put, score values for the images of the same capturing date are ordered in descending order, and in the order of pages P1, P2, P3, P4, P5, P1, P2 . . . one by one each image is assigned. Note that a case in which a number of images to distribute is not an integer multiple of a number of images to lay out on one page may occur. In such a case, an image that is passed over due to a score value is distributed until an integer multiple is achieved. Depending on the case, it may be sufficient to have blanks or assign an image from a subsequent capturing date. Note that the above distribution of image files to pages is an example, a there is no limitation to the above. For example, configuration may be taken such that it is possible to set a date range in which capturing dates are acknowledged to be the same. For example, if this date range is set small (one day), it is possible to create an album for each day of a homecoming, for example. In addition, if the date range is set comparatively large at 3 months, for example, it is possible to create an album for the four seasons. If the date range is set to a year, it is possible to create an album for each school year of a school. In addition, clustering may be performed in accordance with another rule instead of clustering by date. Furthermore, configuration may be such that several rules are provided in advance, and a user selects one from these to perform clustering. To simplify the explanation, explanation is given in which the four images 901-904 of FIG. 9 are assigned as images located in one double-page spread page.

In step S2005, the CPU 1011, in accordance with input via the input apparatus 1007 from a user, sets a category to each page by assigning a category for each page. For a category to assign, a category set that is decided in advance is used. A category for each page is decided in advance as illustrated in FIG. 11, for example. In FIG. 11, although a category is decided for up to the tenth page, a page that goes over to the 11th page returns to and uses the category for the first page. In addition, configuration may be taken to prepare and use categories for a number of pages that can be created. Furthermore, it is also possible to change a decided category according to a user's tastes. Category 1, a basic form, is often distributed in a case of producing, from a created album or at a time of album creation, a simple atmosphere in accordance with an input operation of a user. In addition, category 2 or category 3, which are categories other than the basic form, are often distributed in a case of producing a dynamic atmosphere. In this way, a sample of category assignments in accordance with a user's preferences is prepared in advance, and a user may select one from this. In addition, configuration may be taken so as to decide a category for only characteristic pages, and decide other categories randomly. For example, it is possible to decide a category for only a final page, and to decide randomly for other pages. In any event, by deciding a category for each page, it is possible to cause a type of a template to be laid out to change.

In step S2006, from the result of the scoring in step S2003, the CPU 1011 lays out from that which has a high score. A template selected at this point is selected from among templates of a category assigned to the page.

Figure 12A:
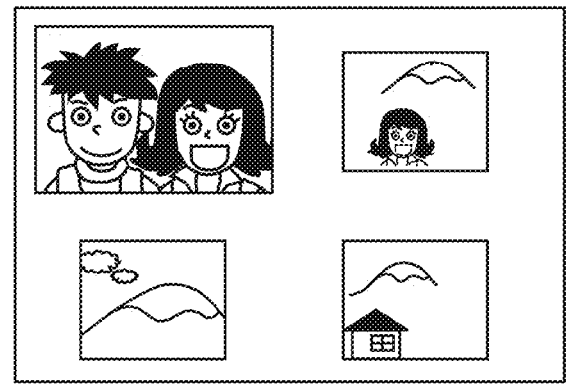
FIGS. 12A-12C are views for locating with respect to each template of the first embodiment.

When laying out the first and second pages, for example, because category 1 is assigned if in accordance with FIG. 11, the category 1 templates of FIG. 3 and FIG. 4 are used. From the tables of FIG. 4 and the scoring result of FIG. 10, one highest matching (approximate) template is selected. In the scores of FIG. 10, because the image 901 of a temporal sequence 1 has the highest score, a template having a high priority order for the temporal sequence 1 is selected. In the tables of FIGS. 4A-4D, because the table of FIG. 4A has the highest priority order of 1 for the first slot, the CPU 1011 selects the template of FIG. 4A. By using the selected template to locate images, the CPU 1011 generates a page of the layout illustrated in FIG. 12A.

Figure 5A:
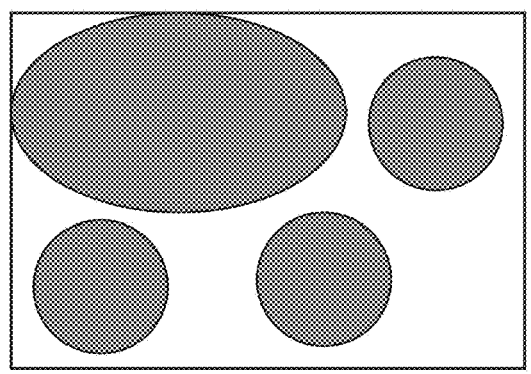
FIGS. 5A-5D are views illustrating non-rectangular templates of the first embodiment.
Figure 5B:
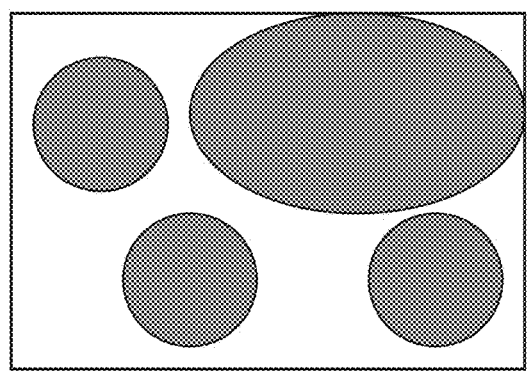
Figure 5C:
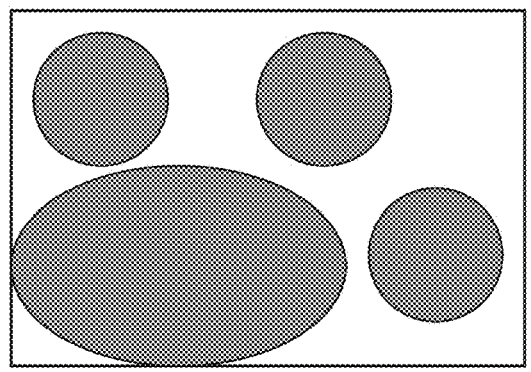
Figure 5D:
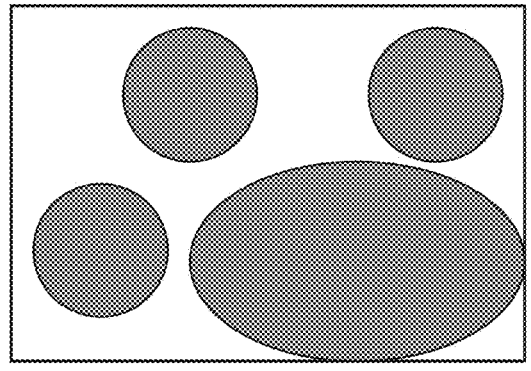
Figure 12B:
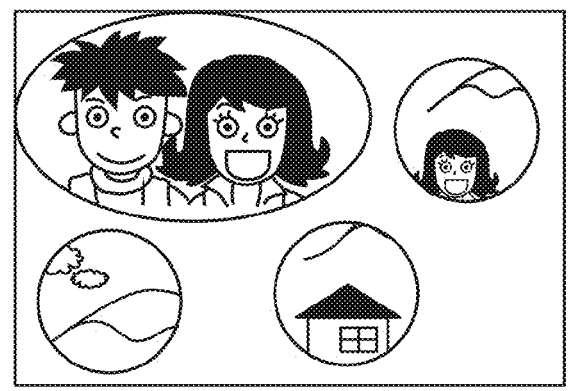

The above is an example in which the four images 901-904 of FIG. 9 are assigned to the first page, but, hypothetically, it is assumed that these four images 901-904 are distributed to the fifth page. In such a case, by the table of FIG. 11, a template of category 2 is assigned to the fifth page. Accordingly, the templates of FIG. 5 and FIG. 6 are referred to, and from the tables of FIGS. 6A-6D and the scoring result of FIG. 10, a template matching the most is selected. In such a case, the template of FIG. 5A is selected. If this template is used to locate images, a page of the layout illustrated in FIG. 12B is created. Note that, in the embodiments, the same images are located on the first and second pages as well as the fifth and sixth pages for convenience of paper surfaces, but because actually images are distributed for each page in step S2004, layout is performed with different images.

Figure 7A:
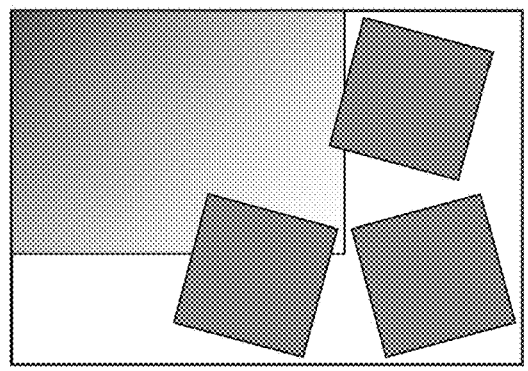
FIGS. 7A-7D are views illustrating effect-type templates of the first embodiment.
Figure 7B:
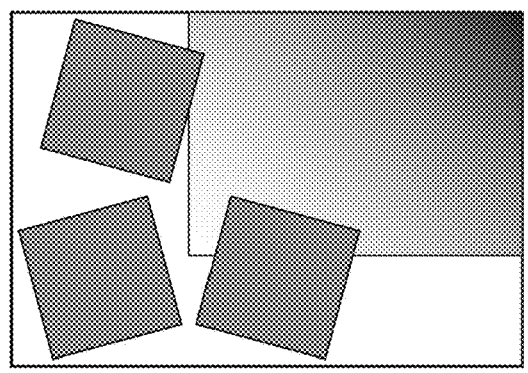
Figure 7C:
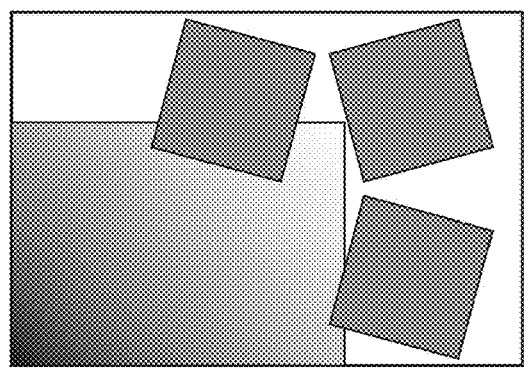
Figure 7D:
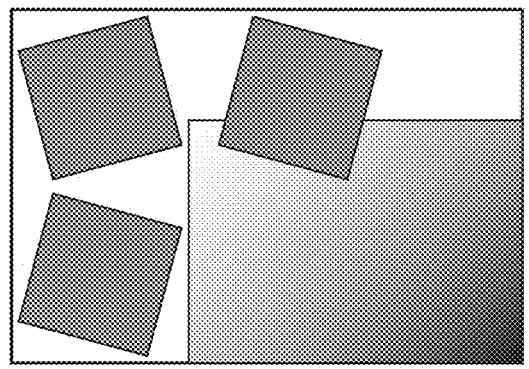
Figure 9A:
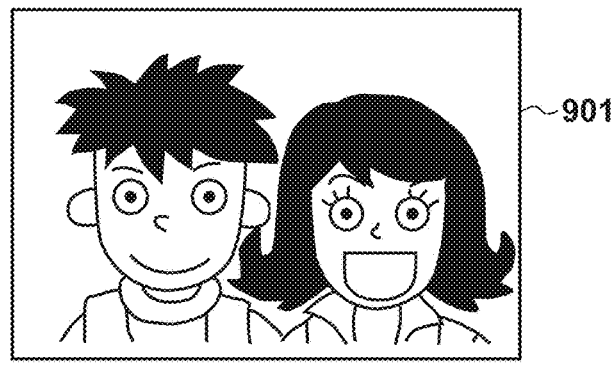
FIGS. 9A-9D are views illustrating layout candidate images of the first embodiment.
Figure 9B:
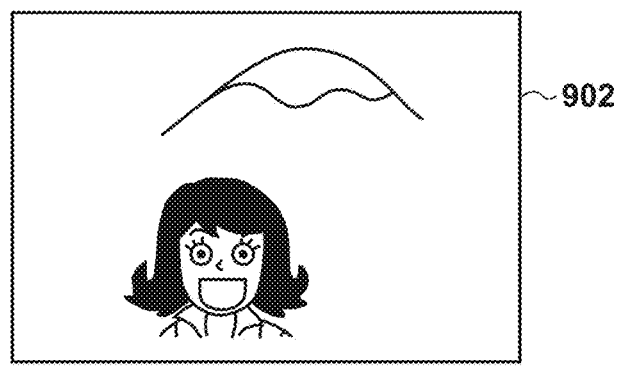
Figure 9C:
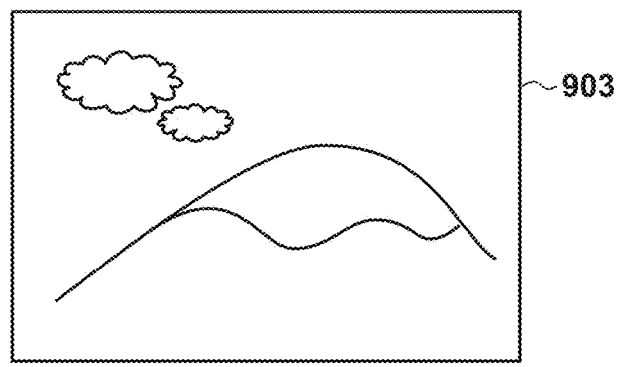
Figure 9D:
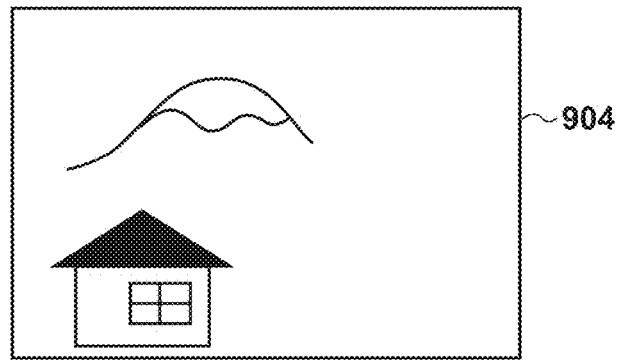
Figure 12C:
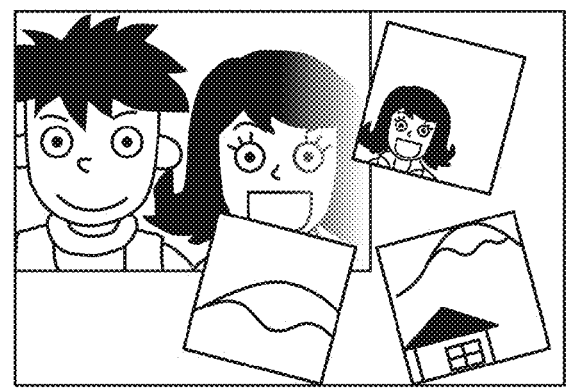

In addition, it is hypothetically assumed that the four images 901-904 of FIG. 9 are distributed to the ninth page. In such a case, by the table of FIG. 11, a template of category 3 is assigned to the ninth page. Accordingly, the templates of FIG. 7 and FIG. 8 are referred to, and from the tables of FIGS. 8A to 8D and the scoring result of FIG. 10, a template matching the most is selected. In such a case, the template of FIG. 7A is selected. If this template is used to locate images, a page of the layout illustrated in FIG. 12C is generated. Note that, in the embodiments, the same images are distributed to the first and second pages, the fifth and sixth pages, as well as the ninth and tenth pages for convenience of paper surfaces, but because actually images are distributed for each page in step S2004, layout is performed with different images.

Until it is determined that the above processing has completed for all pages (until step S2007 indicates "completion"), the CPU 1011 repeats the processing of step S2006. As a result, it is possible to generate an album configured by images present in the designated folder.

In the present embodiment, it is possible to decide an optimal template for scored images, because the constraints on templates are only a temporal sequence and a priority order, and because it is easy to prepare templates of variations of combinations of these. However, if constraints, such as matching of an aspect ratio of a slot and an aspect ratio of an image or a type of an image assigned to a slot, increase, it becomes difficult to prepare templates having variation for all combinations. In such a case, the constraints are caused to have weights, and a template that most satisfies the constraints is selected. In such a case, it is difficult to prepare templates having equal variation with respect to three categories. For example, many variations can be created for a basic form template because they are easy to create, but variations are hard to create for an effect-type template because there is a need to create them by including processing. Therefore, if a template is decided, in accordance with scoring of images, from a template set that summarizes templates of all categories, it may become easy to select templates of a category having many variations. However, by dividing categories in advance as in the present embodiment, it becomes possible to distribute templates for a desired category to specific pages, irrespective of whether the number of templates is few or many.

Furthermore, it can be said that, for a similar problem of whether the number of templates is few or many, it is the same for the number of slots included in the number of pages. In other words, if the number of slots is small, because there are few variations themselves, it is easy to create a template set in which all constraints are satisfied, but if the number of slots becomes large, because the variations increase by factorial, it becomes impossible to create templates that all satisfy the constraints. Accordingly, it becomes easier to select a template set having a small number of slots rather than a template set having a large number of slots. This problem is essentially the same as the problem to be solved of the present embodiment, and in the embodiments, categories were divided based on an effect or a shape of a slot, but by dividing categories in accordance with whether a number of slots is few or many, it becomes possible to control a number slots for the photo album overall.

In addition, in the present embodiment, the number of categories was limited to three, but when implementing, the number of categories is not limited to three, and there is no particular restriction on this number.

The templates of the categories distributed for each page in step S2005 are caused to be applied, while switching, to all pages. As a result, it becomes possible to perform control such as using a layout template in which an image processing effect is input, or changing a slot shape for a second half of a photo album as a whole.

In step S2007, if layout for all pages is not completed, the information processing apparatus 1004 lays out for the next page in step S2006. If layout for all pages is complete, the processing terminates.

By the above flow process, categories are set for templates, and categories are assigned to pages. When selecting a template, by selecting from templates of a category, it is possible to create a photo album that is varied as a whole by intention. By the flow process, even for templates for which it is hard to increase variation with respect to a number of slots, a slot shape, a constraint for a slot, or the like, categories are divided, and a category is assigned to each page. As a result, it is possible to apply a template of a specific type to a specific page. Category division can also mean adding variation for each season, in addition to a slot shape or a number of slots. If automatically creating a photo album in which one year's photos are assigned to 12 double-page spread pages, a template having taste for the days and months corresponding to each double-page spread is prepared. By switching for each page, it becomes possible to also create a photo album in which templates having features of the days and months of the year are distributed.

Second Embodiment

In the above first embodiment, it is possible to assign categories in units of pages. Therefore, because categories are uniquely decided for each page, it is possible to respond to a desire such as wanting a final page to be a particular template, for example. However, due to an image set, there may be a case in which there are no matches at all for a prepared category, and there may be a case in which it is not possible to create a photo album for an intended page.

In the second embodiment, explanation is given regarding a method of causing photo albums to be created by using a basic form template set as much as possible, even if assigning is not performed because special categories are distributed to each page and a number of template sets that the special category has is small.

Figure 13:
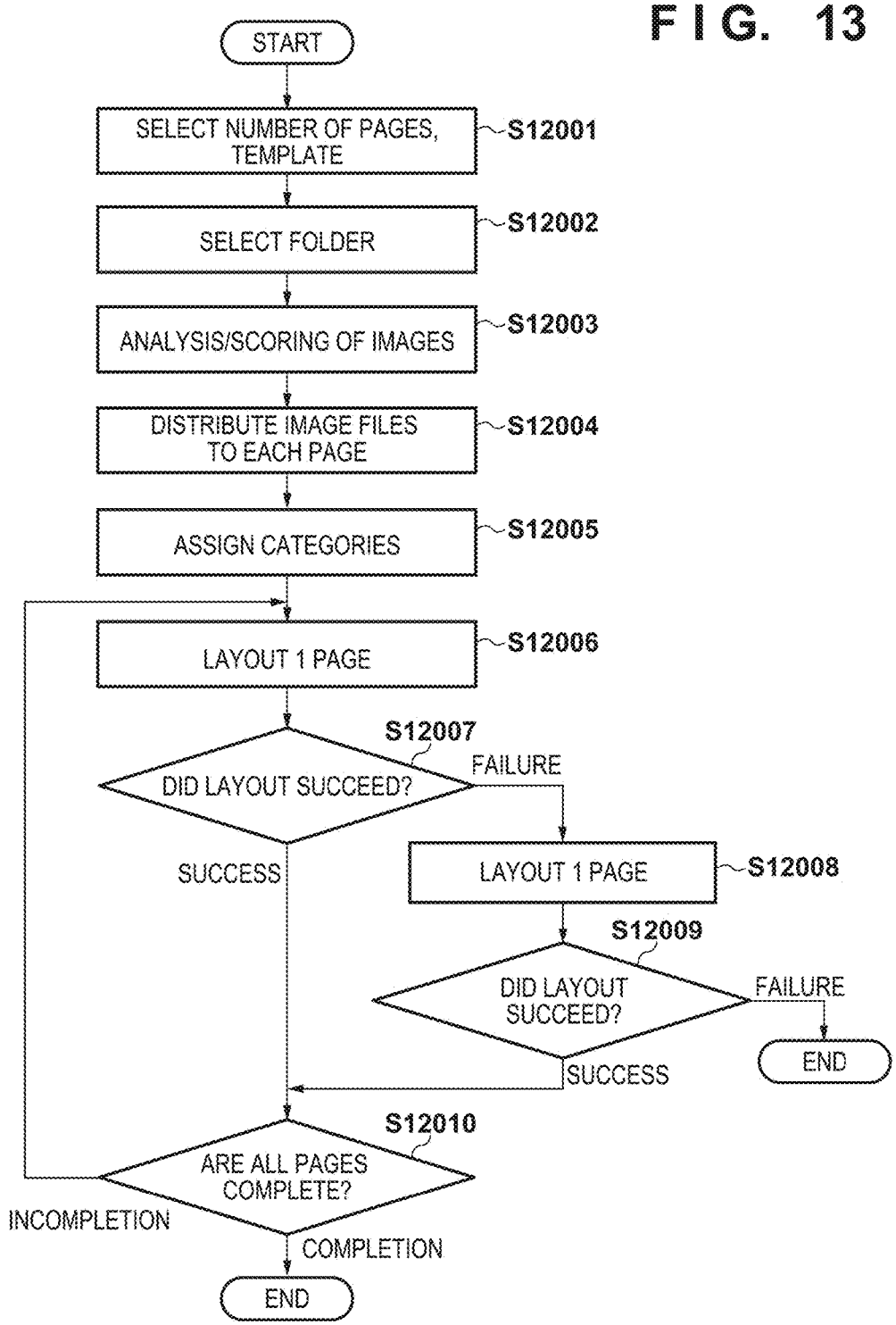
FIG. 13 is a photo album creation flowchart, for explaining a second embodiment.

Note that an apparatus configuration is the same as in the first embodiment, and explanation is given below, in accordance with the flowchart of FIG. 13, of processing of the CPU 1011 when an application in the second embodiment is executed.

In step S12001, the CPU 1011, in accordance with input via the input apparatus 1007 from a user, performs selection of a number of pages, and templates to use in the electronic album. Next, in step S12002, the CPU 1011 selects a folder in the storage apparatus 1008 that stores image files, in accordance with input via the input apparatus 1007 from a user. In step S12003, the CPU 1011 acquires the image files stored in the folder selected by the user, analyzes each image, and performs scoring (an evaluation value calculation).

In step S12004, the CPU 1011 distributes the image files to the pages. The details are the same as in the first embodiment, and thus are omitted.

Next, in step S12005, the CPU 1011 assigns a category for each page in accordance with input via the input apparatus 1007 from a user. The details are the same as in the first embodiment, and thus are omitted.

In step S12006, from the result of the scoring in step S12003, the CPU 1011 lays out from that which has a high score. In step S12007, the CPU 1011 confirms whether a template that matches the result scored in step S12003 is found. If a constraint is set for the template and furthermore a weight is set for the constraint, a template that most satisfies the constraint is selected. However, if a weighted constraint score obtained from the selected images and the selected templates are less than or equal to a threshold value, it is determined to be incongruent even if a best template with respect to an image set has been selected.

For example, it is assumed that the scores of four images to distribute to a page of interest is as in FIG. 10, and the score value of the first image is the highest. A case in which, in a template set of an instructed category, there is nothing for which the priority order of a first image is 1, is a stereotypical example. In addition, this also corresponds to the case in which there is a frame indicating that there is gradation, and an image that should be located in the frame is not present. In such a case, the CPU 1011 sees that a template matching the result scored in step S12003 has not been found, and processing proceeds to step S12008. In addition, if a template is found, processing proceeds to step S12010.

In step S12008, the CPU 1011 performs layout by using a different template set. For the template set used here, a category other than for the template set used in step S12006 is prepared. For example, it is desirable to layout by a template set having a large number of templates, such as a basic form template set. Hypothetically, if a basic form template is used in step S12006, an error may occur at that point in time because this is an image set for which an error occurs even with a basic form template.

In step S12009, it is determined whether the layout in step S12008 succeeded. This processing is the same as the determination processing of step S12007. If layout fails here, processing is suspended after outputting an error that it is not possible to create a photo album with the selected image set, and this process finishes. If layout succeeded, processing proceeds to step S12010.

In step S12010, the CPU 1011 determines whether all page layout processing is finished. If not, step S12006 is returned to, and the above processing repeats. If layout processing is complete for all pages, this process finishes.

By the above flow process, categories are set for templates, and categories are assigned to pages. Even if there are no templates for an image assigned to a page, by using a different template to perform layout, it is possible to create an intended varied photo album to an extent possible, without an error occurring.

By the flow process, even for templates for which it is hard to increase variation with respect to a number of slots, a slot shape, a constraint for a slot, or the like, it is possible to divide categories, and assign a category to each page. As a result, it is possible to apply a template of a specific type to a specific page.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157507, filed Aug. 7, 2015, which is hereby incorporated by reference herein in its entirety.

What is claimed is:

1. An information processing apparatus that creates album data, the apparatus comprising:
   at least one processor causing the apparatus to act as units comprising:
   (1) a management unit configured to manage templates each of which defines a slot for an image to be arranged in a layout page, wherein the templates have been classified into a plurality of template groups, wherein templates belonging to a first template group include slots having a first shape, and wherein templates belonging to a second template group includes slots having a second shape different from the first shape;
   (2) a setting unit configured to set, for each of a plurality of layout pages in an album to be created, one of the plurality of template groups based on setting information, whereby each of the first template group and the second template group are set to at least one of the plurality of layout pages;
   (3) an acquiring unit configured to acquire image files;
   (4) an evaluation unit configured to analyze the acquired image files so as to decide an evaluation value for each image;
   (5) a decision unit configured to decide images allocated to a target layout page of the plurality of layout pages;
   (6) a selection unit configured to select, for the target layout page, one template from templates in a template group that has been set for the target layout page, based on (a) the evaluation values of images allocated to the target layout page and (b) capturing date and times of images allocated to the target layout page; and
   (7) a layout unit configured to arrange, in a template selected for the target layout page, images allocated to the target layout page and to generate album data,
   wherein, if the first template group is set to the target layout page, the selection unit selects, from templates which include slots having the first shape, a first template satisfying a first condition based on the evaluation values and the capturing date and times of images allocated to the target layout page, and
   wherein, if the second template group is set to the target layout page, the selection unit selects, from templates which include slots having the second shape, a second template satisfying a second condition based on the evaluation values and the capturing date and times of images allocated to the target layout page.

2. The apparatus according to claim 1, wherein the slot has information indicating a position, size, and shape of a frame for locating an image.

3. The apparatus according to claim 2, wherein the slot further has a priority order of each slot.

4. The apparatus according to claim 2, wherein the plurality of template groups includes the first template group including templates which include slots having a rectangle shape as a shape for indicating an outer periphery of an image to locate in a page, the second template group including templates which include slots having a non-rectangular shape as a shape for indicating an outer periphery of an image to locate in a page, and third template group including templates which include slots in which is performed image effect processing upon an image to be located.

5. The apparatus according to claim 2, wherein the evaluation unit decides the evaluation value for the image in accordance with a pre-set algorithm.

6. The apparatus according to claim 5, wherein the at least one processor further causes the apparatus to act as:
a second setting unit configured to set, as the template group of the target layout page, a template group including slots having a rectangle shape for a shape of an outer periphery of a frame for indicating an outer periphery of an image, if, from templates of the template group set for the target layout page, there is no template satisfying a priority order corresponding to the evaluation values and the order of the images allocated to the target layout page.

7. The apparatus according to claim 6, wherein the at least one processor further causes the apparatus to act as:
a control unit configured to interrupt processing with an error if the template group set for the target layout page is a template group including slots indicating that a shape of an outer periphery of a frame for indicating an outer periphery of an image is a rectangle, and, from templates belonging to the template group, there is no template satisfying a priority order corresponding to the evaluation values and the order of the images allocated to the target layout page.

8. The apparatus according to claim 1, wherein the acquiring unit acquires the image files based on designation of a folder that stores image files.

9. The apparatus according to claim 1, wherein the at least one processor further causes the apparatus to act as:
a control unit configured to transmit the generated album data, via a network, to a server apparatus for performing print processing.

10. The apparatus according to claim 1, wherein the number of layout pages are decided according to a designation by a user, and
wherein, after the number of layout pages are decided, the setting unit sets one of the plurality of template groups for each layout page.

11. The apparatus according to claim 1, wherein one layout page corresponds to one double-page spread page.

12. The apparatus according to claim 1, wherein, if the evaluation value of an oldest image whose capturing date and time is oldest among images allocated to the target layout page is highest, the selection unit selects, among templates of a template group set to the target layout page, a template in which a slot for arranging the oldest image has a highest priority among slots in the template.

13. A method of controlling an information processing apparatus that creates album data, the method comprising:
managing templates each of which defines a slot for an image to be located in a layout page, wherein the templates have been classified into a plurality of template groups, wherein templates belonging to a first template group include slots having a first shape, and wherein templates belonging to a second template group include slots having a second shape different from the first shape;
setting, for each of a plurality of layout pages in an album to be created, one of the plurality of template groups based on setting information, whereby each of the first template group and the second template group are set to at least one of the plurality of layout pages;
acquiring image files;
analyzing the acquired image files so as to decide an evaluation value for each image;
deciding images allocated to a target layout page of the plurality of layout pages;
selecting, for the target layout page, one template from templates in a template group that has been set for the target layout page, based on (a) the evaluation values of images allocated to the target layout page and (b) capturing date and times of images allocated to the target layout page; and
arranging, in a template selected for the target layout page, images allocated to the target layout page, and generating album data,
wherein, if the first template group is set to the target layout page, the selecting selects, from templates which include slots having the first shape, a first template satisfying a first condition based on the evaluation values and the capturing date and times of images allocated to the target layout page, and
wherein, if the second template group is set to the target layout page, the selecting selects, from templates which include slots having the second shape, a second template satisfying a second condition based on the evaluation values and the capturing date and times of images allocated to the target layout page.

14. The method according to claim 13, wherein the slot has information indicating a position, size, and shape of a frame for locating an image.

15. The method according to claim 14, wherein the slot further has a priority order of each slot.

16. The method according to claim 14, wherein the plurality of template groups includes the first template group including templates which include slots having a rectangle as a shape for indicating an outer periphery of an image to locate in a page, the second template group including templates which include slots having a non-rectangular shape as a shape for indicating an outer periphery of an image to locate in a page, and a third template group including templates which include slots in which image effect processing is performed upon an image to be located.

17. The method according to claim 14, wherein in the analyzing, the evaluation value for the image is decided in accordance with a pre-set algorithm.

18. The method according to claim 17, further comprising:
setting, as the template group of the target layout page, a template group including slots having a rectangle shape for a shape of an outer periphery of a frame for indicating an outer periphery of an image, if, from templates of the template group set for the target layout page, there is no template satisfying a priority order corresponding to the evaluation values and the order of the images allocated to the target layout page.

19. The method according to claim 18, further comprising:
interrupting processing with an error if the template group set for the target layout page is a template group including slots indicating that a shape of an outer periphery of a frame for indicating an outer periphery of an image is a rectangle, and, from templates belonging to the template group, there is no template satisfying a priority order corresponding to the evaluation values and the order of the images allocated to the target layout page.

20. The method according to claim 13, wherein the acquiring, the image files at acquired based on designation of designating a folder that stores image files.

21. The method according to claim 13, further comprising:
- transmitting the generated album data, via a network, to a server apparatus for performing print processing.

22. The method according to claim 13, wherein the number of layout pages are decided according to a designation by a user, and
- wherein, after the number of layout pages are decided, one of the plurality of template groups for each layout page is set.

23. The method according to claim 13, wherein one layout page corresponds to one double-page spread page.

24. A non-transitory computer-readable storage medium storing a program which causes a computer to execute a method of creating album data, the method comprising:
- managing templates each of which defines a slot for an image to be located in a layout page, wherein the templates have been classified into a plurality of template groups, wherein templates belonging to a first template group include slots having a first shape, and wherein templates belonging to a second template group include slots having a second shape different from the first shape;
- setting, for each of a plurality of layout pages in an album to be created, one of the plurality of template groups based on setting information, whereby each of the first template group and the second template group ate set to at least one of the plurality layout pages;
- acquiring image files;
- analyzing the acquired image files so as to decide an evaluation value for each image;
- deciding images allocated to a target layout page of the plurality of layout pages;
- selecting, for the target layout page, one template from templates in a template group that has been set for the target layout page, based on (a) the evaluation values of images allocated to the target layout page and (b) capturing date and times of images allocated to the target layout page; and
- arranging, in a template selected for the target layout page, images allocated to the target layout page, and generating album data,
- wherein, if the first template group is set to the target layout page, the selecting selects, from templates which include slots having the first shape, a first template satisfying a first condition based on the evaluation values and the capturing date and times of images allocated to the target layout page, and
- wherein, if the second template group is set to the target layout page, the selecting selects, from templates which include slots having the second shape, a second template satisfying a second condition based on the evaluation values and the capturing date and times of images allocated to the target layout page.

* * * * *